United States Patent

Engelsmann et al.

[15] 3,668,988
[45] June 13, 1972

[54] EXPOSURE CONTROLLING STRUCTURE FOR PHOTOGRAPHIC APPARATUS

[72] Inventors: Dieter Engelsmann, Unterhaching; Rolf Schroder, Munich, both of Germany

[73] Assignee: AGFA-Gevaret Aktiengesellschaft, Leverkusen, Germany

[22] Filed: Nov. 5, 1970

[21] Appl. No.: 87,175

[30] Foreign Application Priority Data

Nov. 6, 1969 Germany..................P 19 55 831.7

[52] U.S. Cl...................................95/11 R, 95/53 E, 95/64 R
[51] Int. Cl...................G03b 19/02, G03b 9/02, G03b 9/08
[58] Field of Search................95/11 R, 10 CD, 10 C, 64 R

[56] References Cited

UNITED STATES PATENTS

| | | | |
|---|---|---|---|
| 3,515,047 | 6/1970 | Hahn | 95/11 |
| 3,545,354 | 11/1970 | McCune | 95/11 L |
| 3,464,333 | 9/1969 | Koichi Aoki et al. | 95/64 X |
| 3,526,174 | 9/1970 | Wagner | 95/10 C |
| 3,528,351 | 9/1970 | König | 95/10 CD |

*Primary Examiner*—John M. Horan
*Assistant Examiner*—Kenneth C. Hutchison
*Attorney*—Michael S. Striker

[57] ABSTRACT

A photographic camera wherein the diaphragm is adjusted by a scanning member which scans the position of the needle in a moving-coil instrument. The scanning member is free to scan the needle in response to energization of an electromagnet which is energizable by the camera release. The scanning member then opens a switch which deenergizes the electromagnet whereby the latter permits an impeller to propel the blade of the shutter to an open position subsequent to appropriate adjustment of the diaphragm.

14 Claims, 2 Drawing Figures

INVENTOR
DIETER ENGELSMANN
ROLF SCHRÖDER
BY

INVENTOR

BY DIETER ENGELSMANN
ROLF SCHRÖDER

EXPOSURE CONTROLLING STRUCTURE FOR PHOTOGRAPHIC APPARATUS

BACKGROUND OF THE INVENTION

The present invention relates to photographic apparatus in general, and more particularly to improvements in exposure controlling structures for use in photographic apparatus. Still more particularly, the invention relates to improvements in exposure controls of the type wherein the size of the aperture defined by the diaphragm is determined automatically as a function of the position of the output member in a light meter.

In presently known exposure controlling structures wherein the diaphragm is adjusted in dependency on the position of the needle in a moving-coil instrument, the scanning member which determines the position of the needle and serves to directly or indirectly adjust the diaphragm is held in a cocked position, released from such cocked position, and thereupon returned to cocked position by mechanical control means. As a rule, the mechanical control means comprises a substantial number of parts which must be constructed, assembled, mounted and adjusted with a high degree of precision so as to insure that the size of the aperture defined by the diaphragm is invariably an accurate function of the factor or factors which control the position of the needle, normally the scene brightness and/or the sensitivity of film. Moreover, the parts of the mechanical control means for the scanning member are subjected to considerable wear so that the exposure controlling structure must be adjusted from time to time in order to compensate for such wear and to insure that the adjustment of the diaphragm properly reflects the conditions which influence the exposure.

SUMMARY OF THE INVENTION

An object of the invention is to provide an exposure controlling structure for photographic apparatus which employs a moving-coil instrument or an analogous device for adjustment of the aperture size and which is simpler, more accurate, less prone to malfunction, subject to less wear, and more compact than presently known exposure controlling structures.

Another object of the invention is to provide the exposure controlling structure with a novel operative connection between the release element and the member which scans the position of the output member of the device which determines the aperture size for a particular exposure.

A further object of the invention is to provide an exposure controlling structure which can be used in presently known photographic apparatus, whose energy requirements are low, and which can be used with equal advantage in relatively simple as well as in sophisticated photographic apparatus.

An additional object of the invention is to provide an exposure control which can initiate the making of an exposure without relying exclusively on mechanical transmission of motion, for example, in response to signals which are transmitted by way of conductors or in response to radio signals.

The invention is embodied in a photographic apparatus which comprises an adjustable diaphragm, adjusting means for the diaphragm including an output member (such as the needle of a moving-coil instrument) which is movable between a plurality of positions and scanning means for scanning the position of the output member, the scanning means being movable from an idle position to a scanning position to thereby adjust the diaphragm (for example, by way of a link train or a gear train) as a function of the position of the output member, and control means including electromagnet means which is operative to effect a movement of the scanning means from the idle to the scanning position.

The photographic apparatus further comprises a shutter and actuating means which preferably forms part of the control means and can actuate the shutter with a delay following the operation of the electromagnet means. Thus, the size of the aperture which is defined by the diaphragm is already selected as a function of the position of the output member when the actuating means is free to actuate the shutter.

In accordance with a presently preferred embodiment of the invention, the control means further comprises a preferably deformable release element, a normally open first switch in circuit with the electromagnet means, and a normally closed second switch in circuit with the electromagnet means. The release element can be deformed by the operator to close the first switch and to thereby energize the electromagnet means which then permits or cause the scanning means to move from the idle to the scanning position. The second switch is preferably opened by the scanning means when the latter reaches its scanning position to insure deenergization of the electromagnet means. Such deenergization of the electromagnet means results in opening of the shutter.

The novel features which are considered as characteristic of the invention are set forth in particular in the appended claims. The improved exposure controlling structure itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
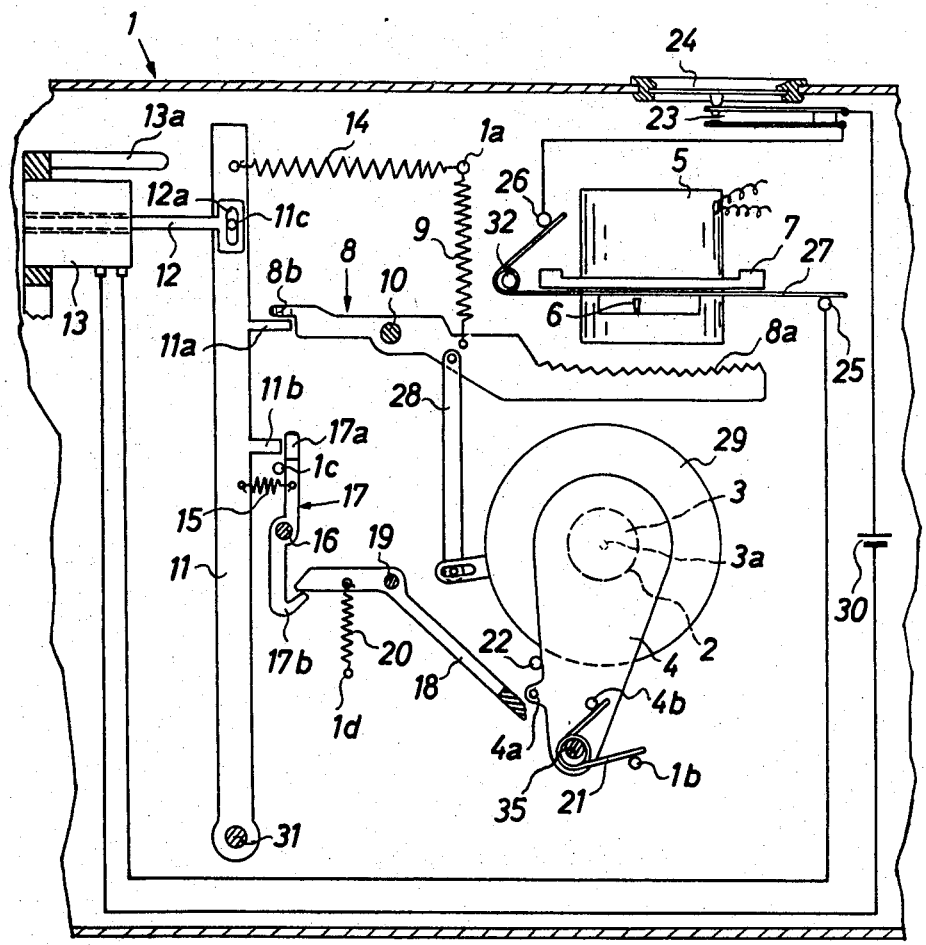
FIG. 1 is a fragmentary schematic longitudinal vertical sectional view of a still camera having a built-in exposure controlling structure which embodies one form of the invention.

Referring first to FIG. 1, there is shown a portion of a still camera having a housing or body 1 one wall of which (or a separate part in the housing) defines a light-admitting aperture 2 in registry with the picture taking objective, not shown. The improved exposure controlling structure controls means for adjusting a diaphragm 3 and includes actuating means for a shutter here shown as including a single pivotable blade 4. The adjusting means adjusts the diaphragm 3 in dependency on one or more factors (such as the intensity of scene light and/or the sensitivity of film), and the actuating means for the shutter becomes operative upon completed adjustment of the diaphragm.

The means for adjusting the diaphragm 3 comprises a light meter 5, for example, a customary moving-coil instrument having an output member or needle 6 whose position is indicative of the necessary adjustment of the diaphragm 3 so that the latter furnishes an aperture having a size which is best suited for the making of an exposure at the prevailing scene brightness. For example, the angular position of the needle 6 can be indicative of the intensity of scene light and the angular position of the housing of the light meter 5 can be indicative of the sensitivity of film which is being used in the camera. Each of the two adjustments is preferably effected automatically in a well known manner. Thus, the circuit of the light meter 5 may include one or more photosensitive receivers which are exposed to scene light and control the angular position of the needle 6, and the angular position of the housing of the light meter 5 can be adjusted automatically by a coding means on the cartridge or cassette which contains the film. Such features are so well known that the receiver or receivers and the cartridge for film were omitted in FIGS. 1 and 2 for the sake of clarity.

Figure 2:
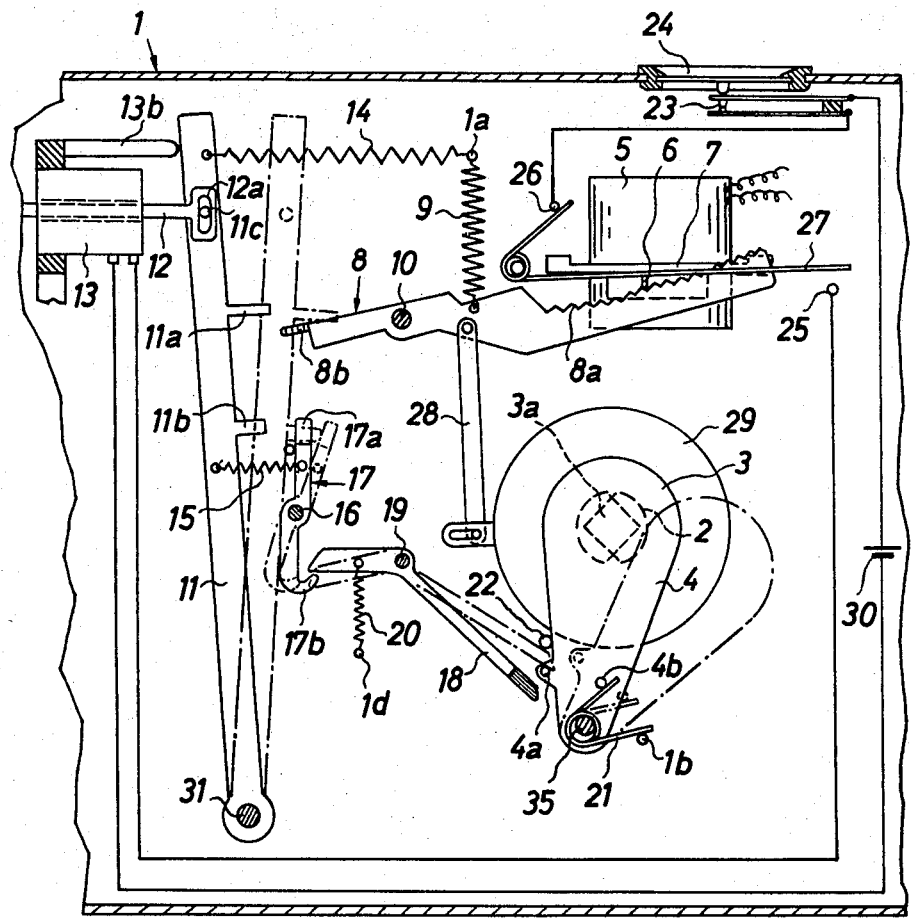
FIG. 2 is a similar view but showing the parts of the exposure controlling structure in different positions.

The needle 6 is movable along a stationary back support or anvil 7 and can be scanned or tracked by the serrated edge face 8a of a scanning member 8 here shown as a two-armed lever which is fulcrumed in the housing 1, as at 10, and is biased in a counterclockwise direction, as viewed in FIG. 1, toward the operative position of FIG. 2 by a helical spring 9 which is attached to a post 1 a in the housing 1. The longer arm of the scanning member 8 is provided with the aforementioned serrated edge face 8a, and its shorter arm 8b is caused by the spring 9 to bear against a projection or arm 11a on an elongated blocking lever 11 which is pivotable on a pin 31 secured to the housing 1. When the arm 8b engages the arm 11a of the blocking lever 11, the scanning member 8 is held in the illustrated idle position. The adjusting connection between the scanning member 8 and the diaphragm 3 comprises a linkage 28 which couples the scanning member to a turnable ring-shaped setting member 29 of the diaphragm. It is assumed that the diaphragm 3 defines an aperture 3a of smallest size when the arm 8b of the scanning member 8 bears against the arm 11a of the blocking lever 11.

The upper portion of the blocking lever 11 carries a pin 11c which extends into an elongated slot 12a provided in a disengaging member 12 which is connected with or constitutes the armature of an electromagnet 13. For the sake of simplicity, the disengaging member 12 will be called an armature which serves to pivot the blocking lever 11 against the opposition of a biasing means 14 in response to energization of the electromagnet 13. The biasing means 14 is a helical spring which is attached to the aforementioned post 1a of the housing 1. A stop 13a serves to arrest the blocking lever 11 in a second position which is shown in FIG. 2 by solid lines.

A further helical spring 15 couples a median portion of the blocking lever 11 with an arresting pawl 17 which is pivotable on a pin 16 of the housing 1 and has an arm 17a which is caused by the spring 15 to bear against a stop pin 1c of the housing 1 when the parts 11, 12 of the exposure controlling structure assume the first positions shown in FIG. 1. A pallet 17b of the pawl 17 then engages one arm of a two-armed actuating member or impeller 18 which is fulcrumed in the housing 1, as at 19, and is biased by a spring 20 which is attached to a stationary post 1d. FIG. 1 illustrates the impeller 18 in its cocked position; when the pallet 17b is caused to move to the phantom-line position shown in FIG. 2, the spring 20 is free to contract and to propel the impeller 18 in a counterclockwise direction, as viewed in the drawing, whereby the right-hand arm of the impeller strikes a projection or lobe 4a on the shutter blade 4 and propels the blade from its closed toward an open position in which the blade permits scene light passing through the aperture of the diaphragm 3 and the aperture 2 to reach an unexposed film frame. The shutter blade 4 is permanently biased to the closed position of FIG. 1 by a torsion spring 21 one arm of which bears against a pin 4b of the blade and another arm of which reacts against a stationary post 1b of the housing 1. The blade 4 then abuts against a stop pin 22 of the housing 1 and its lobe 4a is located in the path of movement of the right-hand arm of the impeller 18. The torsion spring 21 is coiled around a pivot member 35 for the shutter blade 4.

The exposure controlling assembly which comprises the parts 11, 12, 13 and 18 further includes a normally open master switch or first switch 23 which can be closed by a release element 24 here shown as a deformable diaphragm mounted in the top wall of the housing 1. The switch 23 is in series with an energy source 30 (e.g., a battery) and with a normally closed second switch including a stationary contact 25 and a movable contact 27. The latter constitutes an elastic conductor in the form of a torsion spring which is coiled around a stationary insulator 32 and the shorter arm of which bears against a stationary contact 26 which is connected to the lower contact of the master switch 23.

The operation:

FIG. 1 illustrates the parts 11, 12, 13, 18, 23, 24 and 25—27 of the exposure controlling structure in positions they assume when the camera is ready to make an exposure. The second switch 25, 27 is closed and the master switch 23 is open. The operator applies pressure against the release element 24 which closes the master switch 23 to thereby complete the circuit of the electromagnet 13. The latter becomes energized and attracts the armature 12 against the opposition of the spring 14 whereby the upper end portion of the blocking lever 11 moves into abutment with the stop 13a and the arm 11a moves away from the left-hand arm 8b of the scanning member 8. The position of the needle 6 of the light meter 5 is indicative of the scene brightness and of the sensitivity of film, and such position is scanned by the serrated edge face 8a which moves into engagement with and presses the needle 6 against the back support 7 under the action of the spring 9 which is free to contract and to pivot the scanning member 8 in a counter-clockwise direction in automatic response to energization of the electromagnet 13. The linkage 28 then changes the angular position of the setting member 29 so that the diaphragm 3 defines an aperture whose size is a function of scene brightness and of the sensitivity of film.

The contact 27 of the second switch 25, 27 in the circuit of the electromagnet 13 is located in the path of movement of the right-hand arm of the scanning member 8. Thus, the second switch opens and deenergizes the electromagnet 13 when the serrated edge face 8a engages the needle 6. The spring 14 is then free to contract and pivots the blocking lever 11 from the second position (shown in FIG. 2 by solid lines) to a third position (shown in FIG. 2 by phantom lines). This causes a projection or trip 11b of the blocking lever 11 to strike against the arm 17a of the pawl 17 with the result that the pallet 17b is disengaged from the left-hand arm of the impeller 18. The spring 20 is free to contract and to propel the right-hand arm of the impeller 18 against the lobe 4a so that the shutter blade 4 pivots in a clockwise direction (against the opposition of the torsion spring 21) and permits scene light to reach an unexposed film frame by way of an aperture (defined by the diaphragm 3) whose size is a function of scene brightness and of the sensitivity of the film.

It is clear that the second switch 25, 27 can be replaced with an automatic electronic time-delay device of any known design which prevents deenergization of the electromagnet for a selected (preferably adjustable) interval of time following energization on closing of the master switch 23. The period of energization of the electromagnet 13 should suffice for appropriate adjustment of the diaphragm 3 by the linkage 28 prior to release of the impeller 18. It is further clear that the camera which embodies the improved exposure controlling structure can be provided with a more sophisticated shutter, for example, with a shutter having a plurality of blades and being adjustable to furnish two or more different exposure times. Also, the camera of FIGS. 1 and 2 can be provided with adjustable means which determines the extent of pivotal movement of the blade 4 under the action of the impeller 18 and/or which adjusts the bias of the spring 20 when the impeller 18 is held in cocked position by the pallet 17b. Such means enables the operator to select an optimum exposure time.

The manner in which the parts of the exposure controlling structure are returned to the positions shown in FIG. 1 in order to prepare the camera for the next exposure forms no part of the present invention. In accordance with a presently preferred embodiment, a return movement of such parts can be effected by the film transporting mechanism while the mechanism advances the film by the length of a frame. The exact nature of the means for cocking the impeller 18, for pivoting the scanning member 8 against the opposition of the spring 9 to close the switch 25, 27 and to release the needle 6, and for returning the blocking lever 11 to the first position shown in FIG. 1 will depend on the type, cost and size of the camera and/or other factors.

An important advantage of the improved exposure controlling structure is that its operation necessitates the consumption of relatively small amounts of electrical energy. This is due to the fact that the normally closed second switch 25, 27 opens with a necessary delay in automatic response to closing of the master switch 23 by the release element 24 and that the disengagement of impeller 18 from the pallet 17b takes place under the action of resilient means (spring 14). The length of the interval during which the electromagnet 13 is energized in response to closing of the master switch 23 is selected in advance and is preferably constant. The length of such interval is not dependent on the exposure time but mainly on the time which is necessary to complete the adjustment of the diaphragm 3 in dependency on the position of the needle 6.

The master switch 23 (or other suitable means for energizing the electromagnet 13) can be actuated by a customary pushbutton, by a cable or by radio signals, for example, when it is desired to make one or more exposures by remote control.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

1. In a photographic apparatus, a combination comprising an adjustable diaphragm; adjusting means for said diaphragm, including an output member movable between a plurality of positions and scanning means for scanning the position of said output member, said scanning means being movable from an idle position to a scanning position to thereby adjust said diaphragm as a function of the position of said output member; a shutter; actuating means operable to actuate said shutter; and control means including electromagnet means having a first condition and a second condition and arranged to assume said second condition with a predetermined delay following the assumption of said first condition, said electromagnet means being operative to effect a movement of said scanning means from said idle position to said scanning position in said first condition thereof and to thereupon effect the operation of said actuating means in said second condition thereof so that the actuation of said shutter means takes place with said predetermined delay following the movement of said scanning means from said idle position.

2. A combination as defined in claim 1, wherein said actuating means comprises impeller means arranged to open said shutter following the adjustment of said diaphragm by way of said scanning means.

3. A combination as defined in claim 1, wherein said actuating means forms part of said control means.

4. A combination as defined in claim 1, wherein said control means includes a switch in circuit with said electromagnet means and release means operable to actuate said switch and to thereby energize said electromagnet means whereby the thus energized electromagnet means effects said movement of said scanning means from said idle to said scanning position.

5. A combination as defined in claim 1, wherein said control means further comprises release means including a deformable display.

6. A combination as defined in claim 1, wherein said output member constitutes the needle of a moving-coil instrument.

7. In a photographic apparatus, a combination comprising an adjustable diaphragm; adjusting means for said diaphragm, including an output member movable between a plurality of positions and scanning means for scanning the position of said output member, said scanning means being movable from an idle position to a scanning position to thereby adjust said diaphragm as a function of the position of said output member; and control means including electromagnet means operative to effect a movement of said scanning means from said idle to said scanning position, and blocking means for normally holding said scanning means in said idle position, said electromagnet means having armature means arranged to disengage said blocking means from said scanning means in response to energization of said electromagnet means.

8. In a photographic apparatus, a combination comprising an adjustable diaphragm; adjusting means for said diaphragm, including an output member movable between a plurality of positions and scanning means for scanning the position of said output member, said scanning means being movable from an idle position to a scanning position to thereby adjust said diaphragm as a function of the position of said output member; and control means including electromagnet means operative to effect a movement of said scanning means from said idle position to said scanning position, said control means further including normally open first switch means and normally closed second switch means in circuit with said electromagnet means and release means actuatable to close said first switch means to thereby energize said electromagnet means whereby the latter effects said movement of said scanning means from said idle to said scanning position, said electromagnet means being deenergizable in response to opening of said second switch means.

9. A combination as defined in claim 8, wherein said second switch means is arranged to open in response to movement of said scanning means to said scanning position.

10. In a photographic apparatus, a combination comprising an adjustable diaphragm; adjusting means for said diaphragm, including an output member movable between a plurality of positions and scanning means for scanning the position of said output member, said scanning means being movable from an idle position to a scanning position to thereby adjust said diaphragm as a function of the position of said output member; and control means including electromagnet means operative to effect a movement of said scanning means from said idle to said scanning position, said control means further comprising blocking means movable between a first position in which said scanning means is held in said idle position and a second position in which said scanning means is free to move to said scanning position, and biasing means for urging said blocking means to said first position thereof, said electromagnet means having armature means arranged to move said blocking means to said second position against the opposition of said biasing means in response to energization of said electromagnet means.

11. A combination as defined in claim 10, further comprising a shutter and actuating means for actuating said shutter in response to deenergization of said electromagnet means.

12. A combination as defined in claim 11, wherein said biasing means is arranged to move said blocking means to a third position in response to deenergization of said electromagnet means and said actuating means is responsive to movement of said blocking means to said third position.

13. In a photographic apparatus, a combination comprising shutter means movable between open and closed positions; an adjustable diaphragm; adjusting means for said diaphragm, including an output member movable between a plurality of positions and scanning means for scanning the position of said output member, said scanning means being movable from an idle position to a scanning position to thereby adjust said diaphragm as a function of the position of said output member; and control means including electromagnet means operative to effect a movement of said scanning means from said idle to said scanning position, said control means further comprising blocking means movable by said electromagnet means from a first position in which said blocking means holds said scanning means in said idle position to a second position in which said scanning means is free to move toward said scanning position, said blocking means being arranged to prevent the opening of said shutter means in said first and second positions thereof.

14. A combination as defined in claim 13, wherein said blocking means and said scanning means are pivotable between said positions thereof.

* * * * *